United States Patent [19]
Hoshino et al.

[11] Patent Number: 5,391,866
[45] Date of Patent: Feb. 21, 1995

[54] POSITION RECOVERY APPARATUS FOR INNER FOCUS LENS

[75] Inventors: Mitsuo Hoshino, Saitama; Atsushi Takano, Kanagawa, both of Japan

[73] Assignee: Sony Corporation, Japan

[21] Appl. No.: 34,693

[22] Filed: Mar. 19, 1993

[30] Foreign Application Priority Data

Mar. 31, 1992 [JP] Japan .................. 4-077973

[51] Int. Cl.⁶ ............................................. G02B 15/00
[52] U.S. Cl. ............................. 250/201.2; 359/696
[58] Field of Search ............... 250/201.2, 201.3, 201.4, 250/201.1, 237 G, 231.1, 206.1; 354/400, 402, 404; 359/696, 697, 698

[56] References Cited

U.S. PATENT DOCUMENTS

| | | | |
|---|---|---|---|
| 5,016,993 | 5/1991 | Akitake | 359/696 |
| 5,144,491 | 9/1992 | Ushiro et al. | 359/697 |
| 5,150,260 | 9/1992 | Chigira | 359/696 X |
| 5,204,710 | 4/1993 | Tsukamoto et al. | 354/402 |
| 5,291,335 | 3/1994 | Ogino | 359/696 |

FOREIGN PATENT DOCUMENTS

| | | |
|---|---|---|
| 0394901 | 10/1990 | European Pat. Off. |
| 2210704 | 6/1989 | United Kingdom |

OTHER PUBLICATIONS

Patent Abstracts of Japan vol. 16, No. 167 (P-1342) 22 Apr. 1992 & JP-A-04 15 609 (Matsushita Electric) 21 Jan. 1992.
Patent Abstracts of Japan vol. 15, No. 503 (P-1290) 19 Dec. 1991 & JP-A-03 217 806 (Matsushita Electric) 25 Sep. 1991.
Patent Abstracts of Japan vol. 16, No. 131 (P-1332) 3 Apr. 1992 & JP-A-03 294 810 (Matsushita Electric) 26 Dec. 1991.

*Primary Examiner*—David C. Nelms
*Assistant Examiner*—John R. Lee
*Attorney, Agent, or Firm*—Ronald P. Kananen

[57] ABSTRACT

A feed screw (3) is coupled to a stepping motor (2) and a moving member (4) is provided along the feed screw (3). The moving member (4) includes a rack (7) that is meshed with the feed screw (3). The moving member (4) has a lens supporting member (9) secured to its lower end, and a light emitting element (13) and a slit (4) are fixed to the lens supporting member (9). A semiconductor position detecting element (15) is secured within a lens housing in association with the slit (14). If the position of a lens (L) is fluctuated by a shock or the like when or after an image is properly focused, a distance in which a light passed through the slit (14) from the light emitting element (13) is moved on the semiconductor position detecting element (15) is electrically converted to drive the motor (2), thereby the lens (L) being recovered to the properly-focused position. The number of teeth of the feed screw in which the teeth are skipped when the rack is disengaged is determined precisely. Then, the lens is moved by the distance corresponding to the fluctuated amount and is returned to the properly-focused position. Also, an electric power consumption can be reduced on the whole and the size of the whole of the apparatus can be reduced.

15 Claims, 2 Drawing Sheets

POSITION RECOVERY APPARATUS FOR INNER FOCUS LENS

BACKGROUND OF THE INVENTION

1. Field of the Invention

The present invention generally relates to apparatus for adjusting a focal length of a lens in a video tape recorder (VTR) having a built-in camera or the like and, more particularly, to a focus adjustment apparatus that can detect a lens position with accuracy.

2. Description of the Related Art

Most of focus adjustment apparatus is small in size and generally comprises a feed screw disposed in an optical axis direction of a lens, a lens supporting member that can be moved forwardly and backwardly in accordance with the rotation of the feed screw or the like. According to the conventional focus adjustment apparatus of this type, after the lens is set to the initial position by energizing a reset switch, the feed screw is rotated by a motor to move the lens supporting member having the lens secured thereto forwardly or backwardly, thereby effecting the focus adjustment.

In this conventional focus adjustment apparatus, 30% to 50% of a load applied to the motor when the lens is being focused in the zoom lens mode is used as a pressure to enable the rack and the feed screw to be operated in a satisfactory meshed condition.

Although the above conventional focus adjustment apparatus is relatively small in size, it can endure a shock of about 100 G if the above pressure for enabling the rack to be satisfactorily meshed with the feed screw is selected to be sufficiently large. However, if the focus adjustment apparatus is increased twice in size, then the weight thereof is considerably increased, e.g., 8 times the original weight when proportioned simply. As a consequence, in proportion to the increased weight of the focus adjustment apparatus, a load applied to the motor also is increased, requiring a drive force of the motor to be increased.

If the above pressure at which the rack can be satisfactorily meshed with the feed screw upon operation is increased, then the torque of the motor that rotates the feed screw must be increased. On the other hand, if such pressure is decreased, then the rack is easily disengaged from the screw thread of the feed screw even by a very small shock. There is then the disadvantage that the rack and the feed screw is not meshed with each other (hereinafter referred to as a so-called idle running phenomenon between the rack and the feed screw).

If such idle running occurs between the rack and the feed screw, then a power switch of the focus adjustment apparatus must be turned off and then the focus adjustment apparatus must be again powered by actuating the reset switch because the focus adjustment apparatus is not provided with a position sensor that senses the lens position.

OBJECTS AND SUMMARY OF THE INVENTION

Therefore, it is an object of the present invention to provide an improved focus adjustment apparatus in which the aforesaid shortcomings and disadvantages encountered with the prior art can be eliminated.

More specifically, it is an object of the present invention to provide a focus adjustment apparatus in which a pressure sufficient so that a rack can be meshed satisfactorily with a feed screw is constantly applied to the rack under a certain condition so that, even when a lens is moved over a screw thread of a feed screw due to a shock or the like, such moved amount of the lens can be detected to thereby readily recover the lens to a properly-focused position.

It is another object of the present invention to provide a focus adjustment apparatus in which a torque of a motor can be made small.

It is still another object of the present invention to provide a focus adjustment apparatus which can be miniaturized.

It is a further object of the present invention to provide a focus adjustment apparatus in which an overall electric power consumption can be reduced.

According to a first aspect of the present invention, there is provided a focus adjustment apparatus having a lens provided so that the lens can be moved along a feed screw coupled to a rotary shaft of a motor wherein a focus is adjusted by the movement of the lens. This focus adjustment apparatus comprises a position detecting member for detecting a position of the lens, and a recovery member for moving the lens by a fluctuated amount detected by the position detecting member so that the lens can be returned to an original position when the lens is fluctuated from a properly-focused position by an external shock from the outside.

In accordance with a second aspect of the present invention, there is provided a video camera having a lens provided so that the lens can be moved along a feed screw coupled to a rotary shaft of a motor wherein a focus is adjusted by the movement of the lens. This video camera comprises a position detecting member for detecting a position of the lens, and a recovery member for moving the lens by a fluctuated amount detected by the position detecting device so that the lens can be returned to an original position when the lens is fluctuated from a properly-focused position by an external shock from the outside.

According to the focus adjustment apparatus of the present invention, if the position of the lens supporting member is disengaged from the feed screw by an external shock or the like and the lens is fluctuated from the properly-focused position during or after the lens was located at the properly-focused position, then the fluctuated amount of the lens is detected by the lens position detecting member and the motor is thereby driven to recover the lens to the original properly-focused position.

When the lens position detecting member is formed of the light emitting element, the slit and the semiconductor position detecting element, the amount in which the light passed through the slit from the light emitting element is moved on the semiconductor position detecting element is electrically detected to drive the motor, thereby correcting the lens position

BRIEF DESCRIPTION OF THE DRAWINGS

A better understanding of other objects, features, and advantages of the present invention can be gained from a consideration of the following detailed description of an illustrative embodiment thereof, in conjunction with the figures of the accompanying drawings, in which.

DETAILED DESCRIPTION OF THE PREFERRED EMBODIMENT

A focus adjustment apparatus according to an embodiment of the present invention will hereinafter be described with reference to FIGS. 1 to 3.

Figure 1:
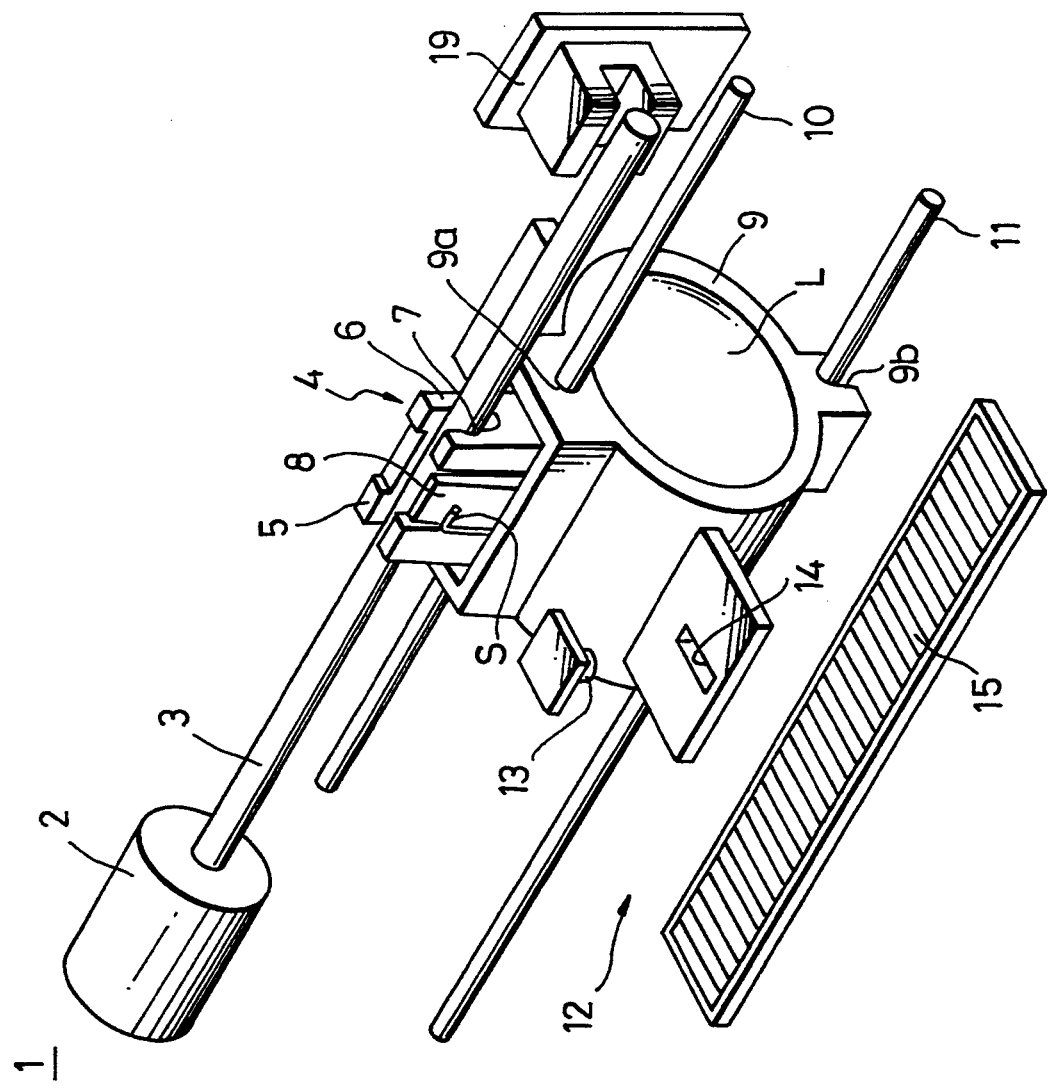
FIG. 1 is a schematic perspective view showing a focus adjustment apparatus according to an embodiment of the present invention.

As shown in FIG. 1 of the accompanying drawings, a focus adjustment apparatus that is generally designated by reference numeral 1 comprises a feed screw 3 coupled to a rotary shaft of a stepping motor 2, a moving member 4 provided so as to move along the feed screw 3, a rack 7 attached to the moving member 4 so as to become meshed with the feed screw 3, a lens supporting member 9 secured to the lower end of the moving member 4, and a lens position detecting member 12 disposed between the fixing side into which the lens supporting member 9 is accommodated and the lens supporting member 9.

The feed screw 3 is disposed above the lens L in the same direction as the optical axis direction of the lens L similarly to the example of the prior art.

Figure 2:
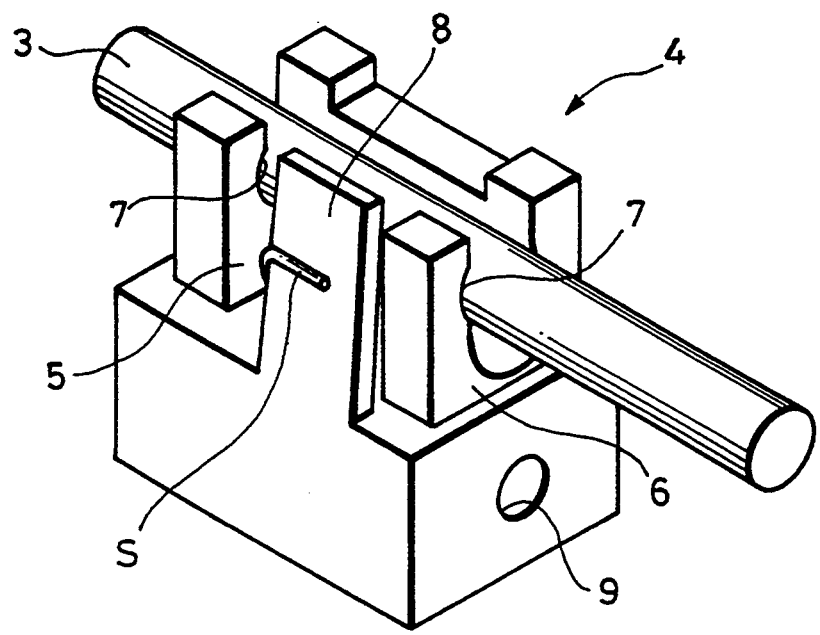
FIG. 2 is a perspective view showing a moving member used in the focus adjustment apparatus shown in FIG. 1 in an enlarged scale.

As shown in FIG. 2, the moving member 4 has a pair of arms 5, 6 of substantially C-letter configuration (as seen from the front) coupled on its upper portion. Racks 7, 7 are respectively formed on the insides of the arms 5, 6 and a pressing member 8 is erected between the arms 5, 6. A spring S is engaged with the pressing member 8, whereby the feed screw 3 is pressed by the pressing member 8 from the lateral side under a force of the spring S. The moving member 4 is fitted into the upper portion of the lens supporting member 9 which will be described later on.

The lens supporting member 9 has an insertion aperture 9a formed on its uppermost end and an insertion slit 9b formed on its lowermost end. An upper rail 10 is inserted into the insertion aperture 9a and a lower rail 11 is inserted into the insertion slit 9b so that each of the upper and lower rails 10, 11 can be freely slid in the front and rear direction.

The above-mentioned fixed side is made immovable regardless of the movement of the lens L. In this embodiment, the inner surface portion (not shown) of the lens housing is utilized as the fixed side.

Figure 3:
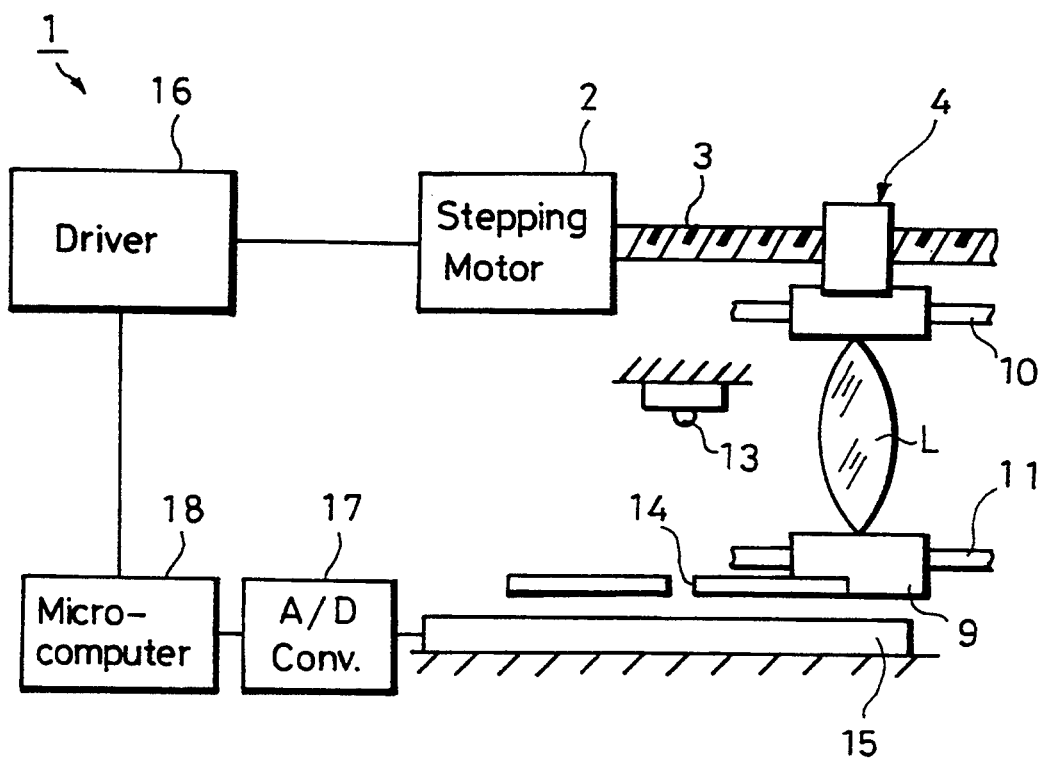
FIG. 3 is a block diagram showing the focus adjustment apparatus according to the embodiment of the present invention.

As shown in FIG. 3, the position detecting element 12 of the lens L comprises a light emitting element 13 such as a light emitting diode (LED) or the like, a slit 14 disposed on the optical path of the light emitting element 13, a semiconductor position detecting element 15 for detecting a light passed through the slit 14 from the light emitting element 13 or the like.

The slit 14 is fixed to the side portion of the above lens supporting member 9 and the light emitting element 13 is fixed to the upper portion of the slit 14.

The semiconductor position detecting element 15 has photo-detecting elements arrayed in the same direction as that of the slit 14. The full length of the semiconductor position detecting element 15 is a little longer than the length in which the lens supporting member 9 is moved, as shown in FIG 1. The semiconductor position detecting element 15 is fixed to the lens housing (not shown) in parallel to the lower rail 11.

The focus adjustment apparatus 1 according to this embodiment further includes a driver 16 for driving the stepping motor 2, an analog-to-digital (A/D) converter 17 for converting an analog signal supplied thereto from the semiconductor position detecting element 15 into a digital signal, a microcomputer 18 for calculating a signal fluctuation amount to control the driver 16, a reset switch 19 for resetting the lens supporting member 9 to a predetermined initial position or the like.

A focus adjustment operation by the focus adjustment apparatus 1 according to this embodiment will be described below.

When the stepping motor 2 is actuated by the driver 16 to rotate the feed screw 3, the lens supporting member 9 is translated and then stopped at the properly-focused position of the lens L.

If the above-mentioned idle running phenomenon occurs between the rack 7 of the moving member 4 and the feed screw 3 due to the external shock or the like during or after the lens L was located at the properly-focused position, then the lens supporting member 9 is moved during a period in which the idle running phenomenon occurred between the rack 7 and the feed screw 3. This moved amount of the lens supporting member 9 is detected by the position detecting member 12 of the lens L and then thereby corrected.

More specifically, a light passed through the slit 14 of the lens supporting member 9 from the light emitting element 13 is moved on the semiconductor position detecting element 15 by a duration of period in which the above idle running phenomenon occurs. Then, the moved amount of the light is supplied through the A/D converter 17 to the microcomputer 18 as the change of a voltage, whereby the stepping motor 2 is driven during a time period of the idle running phenomenon between the rack 7 and the feed screw 3 to correct the fluctuated amount of the lens L.

As described above, according to this embodiment, even when the focus of the lens L is fluctuated by the shock or the like, the fluctuated amount can be readily corrected without actuating the reset switch 19. Therefore, the focus adjustment apparatus of this embodiment can be best suited for, in particular, the focus adjustment of the inner focus type lens in which the feed screw 3 and the rack 7 are meshed with each other by a relatively small amount.

In this invention, various modification and variations could be effected therein without departing from the gist thereof. By way of example, the above optical and electrical lens position detecting member 12 composed of the light emitting element 13, the slit 14, the semiconductor position detecting element 15 or the like may be replaced with an arrangement that electrically converts the change of a magnitude of a magnetic force to thereby detect the fluctuated amount of the lens position.

As set out above, according to the focus adjustment apparatus of the present invention, when the motor is utilized, the moving amount of the moving member and the lens supporting member can be set to be considerably large, for example, about 0.2 to 0.4 mm per revolution of the motor. Also, even when the idle running phenomenon occurs between the rack and the feed screw, the idle running amount between the rack and the feed screw can be clearly determined. Thus, by moving the moving member and the lens supporting member by the fluctuated amount, the lens can be recovered to the properly-focused position. Consequently, according to the embodiment of the present invention, the torque of the motor can be made small, the overall dimension of the apparatus can be reduced and the electric power consumption of the whole of the apparatus can be reduced.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A focus adjustment apparatus having a lens provided so that said lens can be moved along a feed screw coupled to a rotary shaft of a motor wherein a focus is adjusted by the movement of said lens comprising:

position detecting means for detecting a position of said lens, said position detecting means comprising:
an array of sensor elements which are each responsive to a predetermined energy emission and which are aligned essentially parallel with the feed screw; and
a source of said predetermined energy arranged in a predetermined spaced relationship with said array or sensors, one of said array of sensors and said source being operatively connected with said lens for movement therewith and so as to be movable with respect to said array of sensors; and recovery means for moving said lens by a displacement amount detected by said position detecting means so that said lens can be returned to an original position when said lens is displaced from a properly-focused position by an external shock.

2. The focus adjustment apparatus according to claim 1, further comprising a lens supporting member for supporting said lens, and a moving member provided on said supporting member and having a rack meshed with said feed screw.

3. The focus adjustment apparatus according to claim 2, further comprising a rail extended in the same direction as the direction of said feed screw and an insertion portion into which said rail is inserted so that said lens supporting member can be moved on said rail.

4. A focus adjustment apparatus according to claim 1, wherein said source comprises a magnet and said array of sensors comprise sensors which each electrically convert a change in a magnitude of magnetic force.

5. A focus adjustment apparatus according to claim 4, further comprising:

a member in which a slit is formed, said member being interposed between said source and said array of sensors, in a manner wherein said predetermined energy from said source can be transmitted to said array of sensors through said slit, said member being movable with said lens.

6. A focus adjustment apparatus having a lens provided so that said lens can be moved along a feed screw coupled to a rotary shaft of a motor wherein a focus is adjusted by the movement of said lens, comprising:

position detecting means for detecting a position of said lens;
recovery means for moving said lens by a fluctuated amount detected by said position detecting means so that said lens can be returned to an original position when said lens is fluctuated from a properly-focused position by an external shock from the outside;
a lens supporting member for supporting said lens, and a moving member provided on said supporting member and having a rack meshed with said feed screw;
a rail extended in the same direction as the direction of said feed screw and an insertion portion into which said rail is inserted so that said lens supporting member can be moved on said rail,
wherein said lens position detecting means comprises a light emitting element provided on said lens supporting member, a slit disposed on an optical path of said light emitting element, and a photo-detecting element for detecting a light passed through said slit from said light emitting element.

7. The focus adjustment apparatus according to claim 6, further comprising a driver for driving said motor, an analog-to-digital (A/D) converter for converting an output of said photo-detecting element into a digital signal, and a microcomputer for calculating a fluctuated amount of said lens on the basis of an output from said A/D converter to thereby control said driver.

8. The focus adjustment apparatus according to claim 7, further comprising a reset switch for setting said lens supporting member to a predetermined initial position.

9. The focus adjustment apparatus according to claim 8, wherein said focus adjustment apparatus is a focus adjustment apparatus of an inner focus type.

10. A video camera having a lens provided so that said lens can be moved along a feed screw coupled to a rotary shaft of a motor wherein a focus is adjusted by the movement of said lens comprising:

position detecting means for detecting a position of said lens, said position detecting means comprising:
an array of sensor elements which are each responsive to a predetermined energy emission and which are aligned essentially parallel with the feed screw; and
a source of said predetermined energy arranged in a predetermined spaced relationship with said array or sensors, one of said array of sensors and said source being operatively connected with said lens for movement therewith and so as to be movable with respect to said array of sensors; and recovery means for moving said lens by a displacement amount detected by said position detecting means so that said lens can be returned to an original position when said lens is displaced from a properly-focused position by an external shock.

11. The video camera according to claim 10, further comprising further comprising a lens supporting member for supporting said lens, a moving member provided on said supporting member and having a rack meshed with said feed screw, a rail extended in the same direction as the direction of said feed screw and an insertion portion into which said rail is inserted so that said lens supporting member can be moved on said rail.

12. A focus adjustment apparatus according to claim 10, wherein said source comprises a magnet and said array of sensors comprise sensors which each electrically convert a change in a magnitude of magnetic force.

13. A focus adjustment apparatus according to claim 12, further comprising:

a member in which a slit is formed, said member being interposed between said source and said array of sensors, in a manner wherein said predetermined energy from said source can be transmitted to said array of sensors through said slit, said member being movable with said lens.

14. A video camera having a lens provided so that said lens can be moved along a feed screw coupled to a rotary shaft of a motor wherein a focus is adjusted by the movement of said lens, comprising:

position detecting means for detecting a position of said lens;

recovery means for moving said lens by a fluctuated amount detected by said position detecting means so that said lens can be returned to an original position when said lens is fluctuated from a properly-focused position by an external shock from the outside;

a lens supporting member for supporting said lens, a moving member provided on said supporting member and having a rack meshed with said feed screw, a rail extended in the same direction as the direction of said feed screw and an insertion portion into which said rail is inserted so that said lens supporting member can be moved on said rail, wherein said lens position detecting means comprises a light emitting element provided on said lens supporting member, a slit disposed on an optical path of said light emitting element, and a photo-detecting element for detecting a light passed through said slit from said light emitting element.

15. The video camera according to claim 14, further comprising a driver for driving said motor, an analog-to-digital (A/D) converter for converting an output of said photo-detecting element into a digital signal, and a microcomputer for calculating a fluctuated amount of said lens on the basis of an output from said A/D converter to thereby control said driver.

* * * * *